US011611993B2

(12) United States Patent
Christoffersson et al.

(10) Patent No.: US 11,611,993 B2
(45) Date of Patent: Mar. 21, 2023

(54) DETECTING RANDOM ACCESS RESPONSE (RAR) VIA RANDOM ACCESS CHANNEL (RACH) PROCEDURE

(71) Applicant: Telefonaktiebolaget LM Ericsson (publ), Stockholm (SE)

(72) Inventors: Jan Christoffersson, Luleå (SE); Min Wang, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 116 days.

(21) Appl. No.: 16/761,454

(22) PCT Filed: Nov. 5, 2018

(86) PCT No.: PCT/SE2018/051127
§ 371 (c)(1),
(2) Date: May 4, 2020

(87) PCT Pub. No.: WO2019/093947
PCT Pub. Date: May 16, 2019

(65) Prior Publication Data

US 2020/0404712 A1 Dec. 24, 2020

Related U.S. Application Data

(60) Provisional application No. 62/584,140, filed on Nov. 10, 2017.

(51) Int. Cl.

| | |
|---|---|
| ***H04W 74/08*** | (2009.01) |
| ***H04W 28/26*** | (2009.01) |

(Continued)

(52) U.S. Cl.
CPC ....... *H04W 74/0833* (2013.01); *H04W 28/26* (2013.01); *H04W 72/0446* (2013.01);
(Continued)

(58) Field of Classification Search
CPC ............ H04W 74/0833; H04W 28/26; H04W 72/0446; H04W 72/0453; H04W 74/008;
(Continued)

(56) References Cited

U.S. PATENT DOCUMENTS

2011/0045837 A1* 2/2011 Kim .................. H04W 74/0833 455/452.1
2014/0112254 A1* 4/2014 Lindoff .............. H04W 74/002 370/328

(Continued)

OTHER PUBLICATIONS

WO 2018058917 A1 (Year: 2018).*
(Continued)

*Primary Examiner* — Ian N Moore
*Assistant Examiner* — Rushil Parimal Sampat
(74) *Attorney, Agent, or Firm* — Christopher & Weisberg, P.A.

(57) ABSTRACT

Embodiments herein relate to e.g. a method performed by a radio network node for handling communication of a wireless device in a wireless communication network. The radio network node receives, from the wireless device, a preamble of a random access procedure on a first carrier or a second carrier. The radio network node further transmits, to the wireless device, a random access response (RAR), wherein the RAR or transmission of the RAR indicates the carrier out of the first carrier and the second carrier the preamble was received on.

14 Claims, 13 Drawing Sheets

10
12
501. Configuration data
502. Preamble
503. RAR
504. Determine whether preamble detected or not
505. L3 message
506. Decode message

(51) Int. Cl.
*H04W 72/04* (2009.01)
*H04W 74/00* (2009.01)
*H04W 80/02* (2009.01)
*H04W 72/0446* (2023.01)
*H04W 72/0453* (2023.01)

(52) U.S. Cl.
CPC ..... *H04W 72/0453* (2013.01); *H04W 74/008* (2013.01); *H04W 80/02* (2013.01)

(58) Field of Classification Search
CPC ... H04W 80/02; H04W 72/04; H04W 72/046; H04W 74/006; H04W 74/0891; H04B 7/0408; H04B 7/0695
See application file for complete search history.

(56) References Cited

U.S. PATENT DOCUMENTS

2018/0176958 A1* 6/2018 Islam .................... H04W 56/00
2021/0204323 A1* 7/2021 Xu .................... H04W 74/0891

OTHER PUBLICATIONS

International Search Report Written Opinion of the International Searching Authority, PCT/SE2018/051127, dated Feb. 28, 2019, 11 pages.
Mediatek Inc., "On 4-step RACH procedure"; 3GPP TSG-RAN WG1#90; Prague, Czech Republic, R1-1713701; Aug. 21-25, 2017; 6 pages.
Intel Corporation, "NR Random Access Procedure", 3GPP TSG-RAN WG1#90; Prague, Czech Republic, Aug. 21-25, 2017, R1-1712532; 8 pages.
ZTE, "4-step random access procedure", 3GPP TSG-RAN WG1#90; R1-1712067; Prague, Czech Republic, Aug. 21-25, 2017; ZTE, 15 pages.
Huawei, Hisilicon et al., "WF on initial access with SUL"; 3GPP TSG-RAN WG1#90; R1-1714950; Prague, Czech Republic, Aug. 21-25, 2017, 3 pages.
Huawei, Hisilicon, "Initial access and uplink operations with SUL", 3GPP TSG RAN WG1 Meeting #90, Prague, Czech Republic, R1-1712165, Aug. 21-25, 2017, 6 pages.
Huawei, Hisilicon, Remaining issues on the PRACH for SUL, 3GPP TSG RAN WG1 Meeting 90bis Prague, Czech Republic, Oct. 9-13, 2017, R1-1717901, 5 pages.
NEC, "RACH Procedure towards SUL Carrier", 3GPP TSG-RAN WG1 Meeting #90bis Prague, Czech Republic, Oct. 9-13, 2017, R1-1717154, 2 pages.
Samsung, "Initial access for supplementary uplink frequency", 3GPP TSG-RAN WG2 #99bis, Prague, Czech Republic, Oct. 9-13, 2017, R2-1711807, 4 pages.
3GPP TS 36.321 V12.2.1 (Jun. 2014), 3rd Generation Partnership Project; Technical Specification Group Radio Access Network; Evolved Universal Terrestrial Radio Access (E-UTRA); Medium Access Control (MAC) protocol specification (Release 12), 57 pages.
European Search Report for European Patent Application No. 18875811.4, dated Oct. 21, 2020, 4 pages.
EPO Communication dated Dec. 13, 2021 for Patent Application No. 18875811.4, consisting of 6—pages.

* cited by examiner

FIG. 15
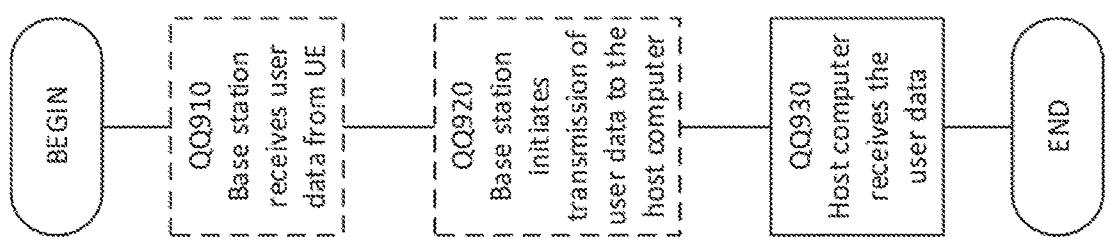
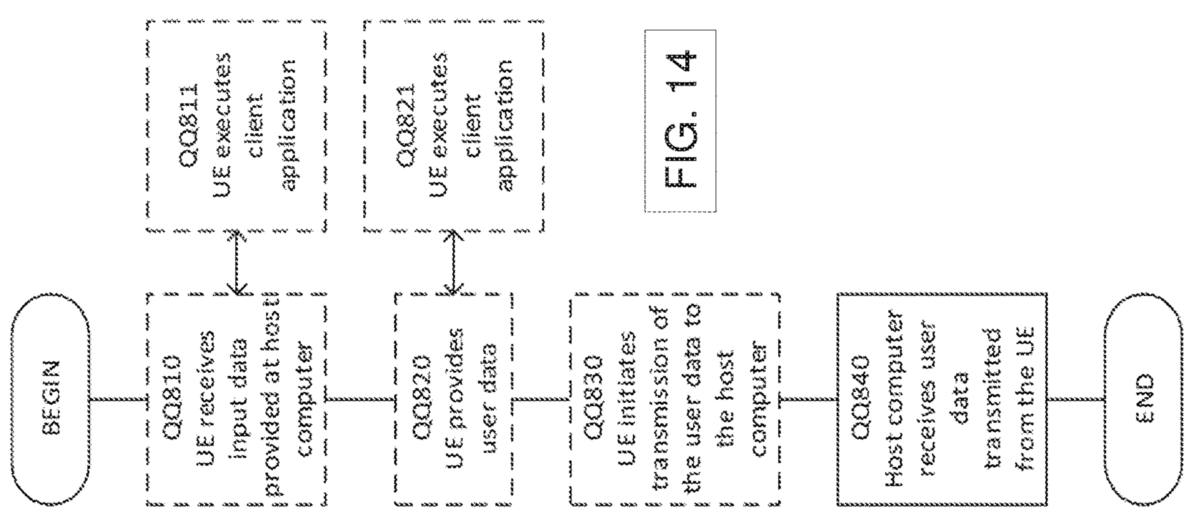
FIG. 14

DETECTING RANDOM ACCESS RESPONSE (RAR) VIA RANDOM ACCESS CHANNEL (RACH) PROCEDURE

This application is a 35 U.S.C. § 371 national stage application of PCT International Application No. PCT SE2018/051127 filed on Nov. 5, 2018, which in turns claims domestic priority to U.S. Provisional Patent Application No. 62/584,140, filed on Nov. 10, 2017, the disclosures and content of which are incorporated by reference herein in their entirety.

TECHNICAL FIELD

Embodiments herein relate to a wireless device, a radio network node and methods performed therein regarding wireless communication. In particular, embodiments herein relate to handling random access response transmissions to the wireless device in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, with each service area or cell area being served by a radio network node e.g., a Wi-Fi access point or a radio base station (RBS), which in some networks may also be called, for example, a NodeB, enodeB or gNodeB. The service area or cell area is a geographical area where radio coverage is provided by the radio network node. The radio network node operates on radio frequencies to communicate over an air interface with the wireless devices within range of the radio network node. The radio network node communicates over a downlink (DL) to the wireless device and the wireless device communicates over an uplink (UL) to the radio network node.

The evolving Fifth Generation (5G) standard New Radio (NR) is aiming to operate in a wide range of frequencies from below 1 GHz up to 100 GHz. At high frequencies, it is well known that coverage will be an issue. One way to mitigate this is the introduction of Supplemental Uplink (SUL) carriers which is mainly motivated by improvement of the uplink coverage for NR which is deployed at relative high frequency bands. The SUL carriers are deployed at the low frequency region, for example, at a Long Term Evolution (LTE) band. In this way, the uplink coverage of NR bands can be comparable with that in LTE.

The SUL carrier is not paired with any downlink frequency from a band combination perspective. The SUL carrier and NR UL carrier together are associated with a downlink NR carrier. From technology potential point of view, there are two options to model the SUL carrier. In a first option, the SUL carrier is modelled as a separate uplink carrier, being different from the NR UL carrier. Both carriers are aggregated in the same way as the uplink carrier aggregation. So, the SUL carrier forms a separate Secondary cell (Scell). In a second option, the SUL carrier and NR UL/DL carriers are in the same cell. In this case, the SUL carrier is more like a separate UL configuration. The wireless device can maintain two UL configurations, while, the wireless device may keep only one UL configuration active. The discussions on these options are still under discussion in 3GPP. At the end, there will be only one option chosen by 3GPP. FIG. 1 shows the coverage difference between NR UL carrier and SUL carrier.

The LTE random access procedure comes in two forms, allowing access to be either contention-based, implying an inherent risk of collision, or contention-free. In contention-based random access, a preamble sequence is randomly chosen by the wireless device, which may result in more than one wireless device simultaneously transmitting the same signature, leading to a need for a subsequent contention resolution process.

The contention-based procedure, shown in FIG. 2, consists of four-step:

1. Preamble transmission, wherein a random access preamble is transmitted e.g. with embedded 1-bit indication for L2/L3 message size;
2. Random access response comprising e.g. timing adjustment, Cell Radio Network Temporary Identifier (C-RNTI), UL grant for L2/L3 message;
3. Transmission of message 3 (MSG3) e.g. L2/L3 message;
4. Contention resolution message e.g. a message for early contention resolution.

Preamble transmission: The wireless device selects one of the 64-Z Physical Random Access Channel (PRACH) contention-based sequences (where Z is the Number allocation for contention-free preambles allocated by the radio network node). The set of contention-based signatures is further subdivided into two subgroups, so that the choice of preamble can carry one bit of information relating to the amount of transmission resource needed to transmit Message 3. The broadcast system information indicates which signatures are in each of the two subgroups (each subgroup corresponding to one value of the one bit of information), as well as the meaning of each subgroup. The wireless device selects a sequence from the subgroup corresponding to the size of transmission resource needed for the appropriate Random Access Channel (RACH) use case, some use cases require only a few bits to be transmitted in MSG3, so choosing the small message size avoids allocating unnecessary uplink resources.

Random Access Response (RAR): The RAR conveys the identity of the detected preamble called random access preamble identity (RAPID), a timing alignment instruction to synchronize subsequent uplink transmissions from the wireless device, an initial uplink resource grant for transmission of the Step 3 message, and an assignment of a temporary Cell Radio Network Temporary Identifier (T-C-RNTI), which may or may not be made permanent as a result of the next step—contention resolution. The RAR is also scrambled with the Random access Radio Network Temporary Identifier (RA-RNTI) when the RAR was detected and indicates the PRACH resource when the preamble was transmitted. The wireless device expects to receive the RAR within a time window, of which the start and end are configured by the radio network node and broadcast as part of the cell-specific system information. If the wireless device does not receive a RAR within the configured time window, it selects another sequence to be transmitted again.

Message 3 transmission: This message is the first scheduled uplink transmission on the Physical Uplink Shared Channel (PUSCH) and makes use of Hybrid Automatic Repeat Request (HARQ). It is addressed to the temporary C-RNTI allocated in the RAR. In case of a preamble collision having occurred at Step 1, the colliding wireless devices will receive the same temporary C-RNTI through the RAR and will also collide in the same uplink time-frequency resources when transmitting their L2/L3 message. This may result in such interference that no transmissions from colliding wireless device can be decoded, and the wireless devices restart the random access procedure after reaching the maximum number of HARQ retransmissions. However, if a transmission of one wireless device is successfully decoded, the contention remains unresolved for the other wireless devices. The following downlink message (in Step 4) allows a quick resolution of this contention.

Contention-resolution: The contention resolution message uses HARQ. It is addressed to the C-RNTI, if indicated in the MSG.3 message, or to the temporary C-RNTI, and, in the latter case, echoes the wireless device identity contained in MSG.3. In case of a collision followed by successful decoding of the MSG.3, the HARQ feedback is transmitted only by the wireless device which detects its own wireless device identity (or C-RNTI); other wireless devices understand there was a collision, transmit no HARQ feedback, and can quickly exit the current random access procedure and start another one.

When a wireless device does random access when a SUL is configured, there may be two options for random access (RA). Either the RA is done on the NR UL or the RA is done on the SUL. In principle, the NR should be used when the wireless device is in coverage of NR and if not, the SUL should be used. Irrespective of which UL is used for the preamble transmission, the Random Access Response (RAR) will be transmitted on the NR DL carrier. The wireless device needs to understand if its preamble transmission has been received by the radio network node e.g. a gNB. In LTE, this is done by the RAPID and RA-RNTI. If these match to the preamble transmitted by the wireless device and the PRACH occasion when it was sent, the wireless device concludes that its transmission was received and allows the wireless device to use the grant supplied in the RAR. More details are found in 3GPP 36.321 (section 5.1.4) v.12.2.1 description, as below:

Once the Random Access Preamble is transmitted and regardless of the possible occurrence of a measurement gap, the wireless device shall monitor the Physical Downlink Control Channel (PDCCH) for Random Access Response(s) identified by the RA-RNTI defined below, in the RA Response window which starts at the subframe that contains the end of the preamble transmission plus three subframes and has length ra-ResponseWindowSize subframes.

According to 3GPP specification 36.321-c80 Section 5.1.4, v12.2.1, the RA-RNTI associated with the PRACH in which the Random Access Preamble is transmitted for the ordinary LTE like PRACH procedure is computed according to the following:

$$\text{RA-RNTI}=1+t\_id+10*f\_id \quad (1)$$

Where t_id is the index of the first subframe of the specified PRACH ($0 \le t\_id < 10$), and f_id is the index of the specified PRACH within that subframe, in ascending order of frequency domain ($0 \le f\_id < 6$).

For Frequency Division Duplex (FDD), f_id is fixed as 0. Hence, RA-RNTI is determined by the transmission timing of subframe of the PRACH Preamble transmission by the wireless device. As there are 10 subframes per radio frame, there are only 10 different values for RA-RNTI within LTE.

For NR, the formula may be updated by allowing a higher number of t_id (which may indicate slots) according to $$\text{RA-RNTI}=1+t\_id+X*f\_id \quad (2)$$

Where t_id refers to the slot where the preamble transmission starts and X is the number of slots per radio frame.

The RA-RNTI is used in the transmission of PDCCH by scrambling of the Cyclic Redundancy Check (CRC) with the RNTI as described in 3GPP 36.212 "Multiplexing and channel coding", v 11.2.0, section 5.3.3.2. For RAR, the RA-RNTI is used for this scrambling of the CRC of PDCCH.

Working group RAN2 has agreed on the following regarding the random-access procedure:

1. PRACH preambles are partitioned into two preamble groups as a baseline. The reason to partition into two groups is for the wireless device to indicate to the radio network node such that the radio network node can provide UL grant for different MSG3 size.
2. Further, RAN2 agreed for PRACH preamble/resource reservation for MSG1 based System information (SI) request method and contention free random access.

The usage of NR-RACH preambles thus includes quite many sets of partitioning such as Contention based with request for MSG3 size 1
Contention based with request for MSG3 size 2
Contention free for beam recovery request
Contention free for SI request
Contention free for handover
Contention free for uplink based positioning?

This partitioning can be configured by remaining system information (RMSI). Also, the number of preambles per cell should be changed according to the need for this partitioning.

It is not yet discussed (or agreed) if the random access on NR and SUL should be indicated by a partition of the preamble space.

Regarding PRACH configuration for an SUL carrier, two options that are feasible from the technology potential perspective may be used. In the first option, the SUL and NR carriers have different preamble or PRACH configurations. Either there are two separate PRACH preamble groups for the SUL carrier and the NR carrier, or they share the same preamble group, while with the split in the time domain, i.e., with different RACH transmission opportunities. In this case, the wireless device initiates a RACH access with a suitable PRACH resource depending on which carrier that the RACH access is started on. The RACH accesses on the SUL carrier and the NR carrier would then be associated with different RA-RNTIs and the wireless device can determine which RAR is intended for itself.

In the second option, there is no separate preamble or PRACH configuration for the SUL carrier and the NR carrier, meaning that the RACH accesses started on the SUL carrier and the NR carrier may choose the same preamble and be transmitted at the same time. This means that if legacy RAR transmission scheme would be used, the radio network node would respond with one RAR scrambled by the RA-RNTI (which would be the same for the colliding preamble transmissions on NR and SUL) with the same RAPID. In this case, it is difficult for a wireless device to determine which RAR is intended for its RACH access request, since the RARs for the SUL carrier and the NR carrier may comprise the same RAPID and RA-RNTI.

SUMMARY

According to embodiments herein the existing LTE RAR framework is improved in order to distinguish between the RARs associated with the different carriers, such as SUL carrier and the NR carrier, separately, e.g. when the SUL carrier and the NR carrier do not have separate preamble or PRACH configurations since this may lead to a reduced or limited performance of the wireless communication network.

An object of embodiments herein is to provide a mechanism that improves the performance of the wireless communication network when handling communication of a wireless device in the wireless communication network.

According to an aspect the object may be achieved by a method performed by a radio network node for handling communication of a wireless device in a wireless communication network. The radio network node receives, from the wireless device, a preamble of a random access procedure on a first carrier or a second carrier. The radio network node further transmits, to the wireless device, a RAR. The RAR or transmission of the RAR indicates the carrier out of the first carrier and the second carrier the preamble was received on.

According to another aspect the object may be achieved by a method performed by a wireless device for handling communication of the wireless device in a wireless communication network. The wireless device transmits to a radio network node, a preamble of a random access procedure on a first carrier or a second carrier. The wireless device further receives from the radio network nod, a RAR, wherein the RAR or the reception of the RAR indicates the carrier out of the first carrier and the second carrier the preamble was received on at the radio network node. The wireless device further determines whether the preamble has been detected or not taking the received RAR and/or the reception of the RAR into account.

Embodiments herein describe methods to identify which carrier was used to transmit the preamble during an access procedure such as a random access and thereby avoid ambiguities for the wireless device to understand if its preamble transmission is detected. This is done by differentiating the RAR transmitted e.g. the RAR window so that certain sub-frames or slots are used for RAR for preambles transmitted on the first carrier and the rest are used for RARs for preambles transmitted on the second carrier. By this arrangement, it is possible to identify if the preamble in the access procedure is transmitted on the first or second carrier even if it cannot be deduced from the access identities such as RAPID and RA-RNTI. Thus, this results in an efficient access procedure leading to an improved performance of the wireless communication network since the solution enables the wireless device to identify if the RAR is for a preamble transmitted on the first or second carrier even if not indicated from the RAPID and RA-RNTI or a combination of the RAPID and the RA-RNTI.

BRIEF DESCRIPTION OF THE DRAWINGS

Embodiments will now be described in more detail in relation to the enclosed drawings, in which:

FIG. 14 shows methods implemented in a communication system including a host computer, a base station and a user equipment in accordance with some embodiments; and FIG. 15 shows methods implemented in a communication system including a host computer, a base station and a user equipment in accordance with some embodiments.

DETAILED DESCRIPTION

Figure 1:
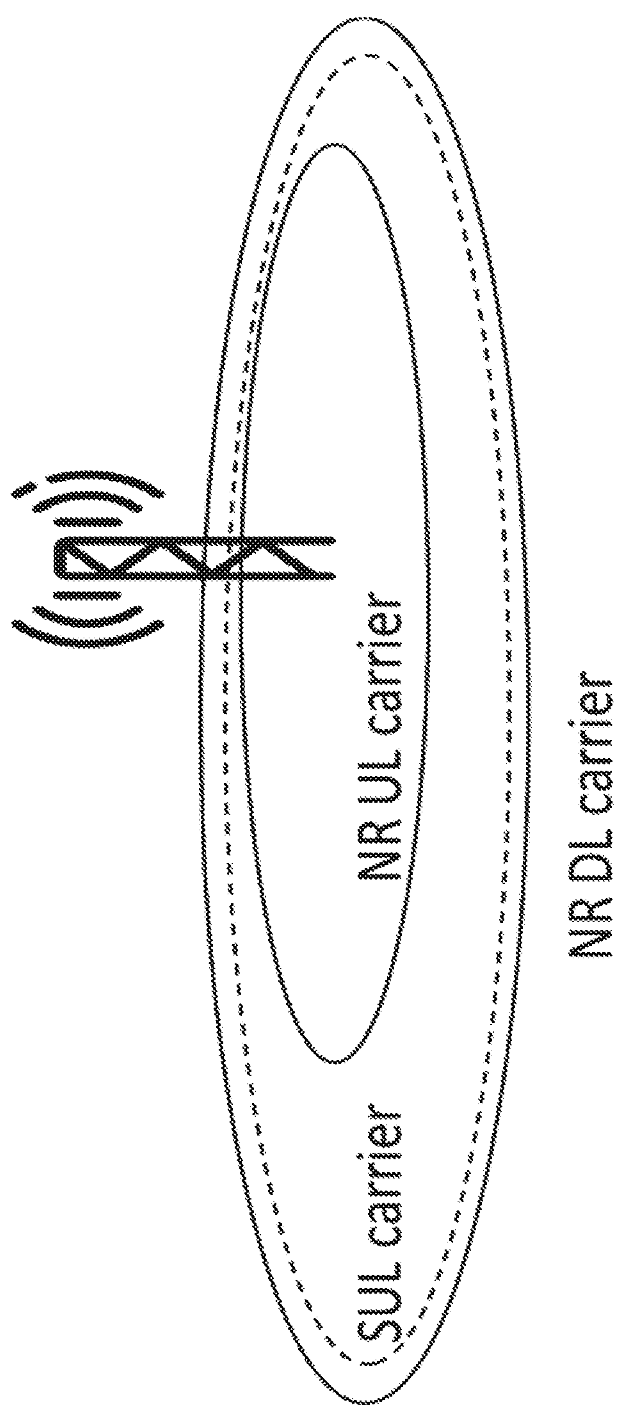
FIG. 1 shows an schematic overview of a coverage of a 3GPP 5G New Radio (NR) network.
Figure 2:
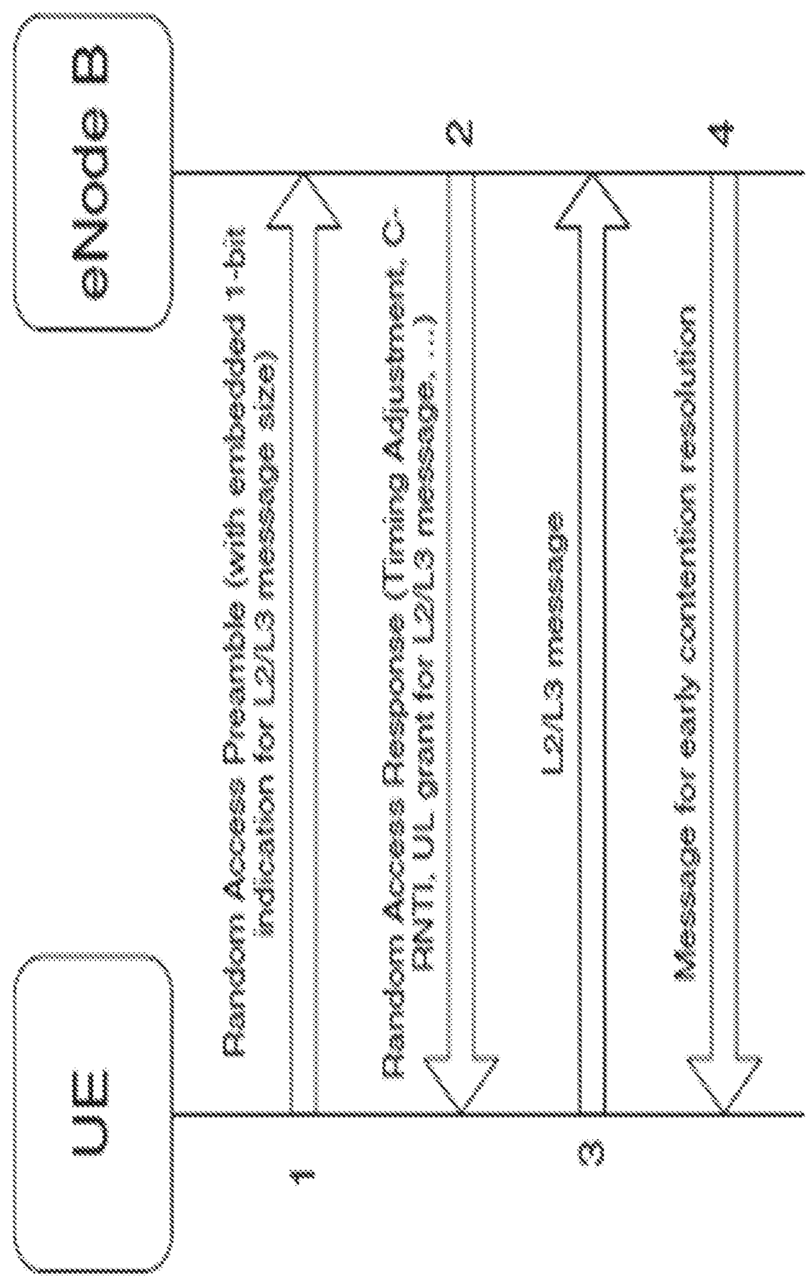
FIG. 2 shows an overview of the RA procedure in LTE.
Figure 3:
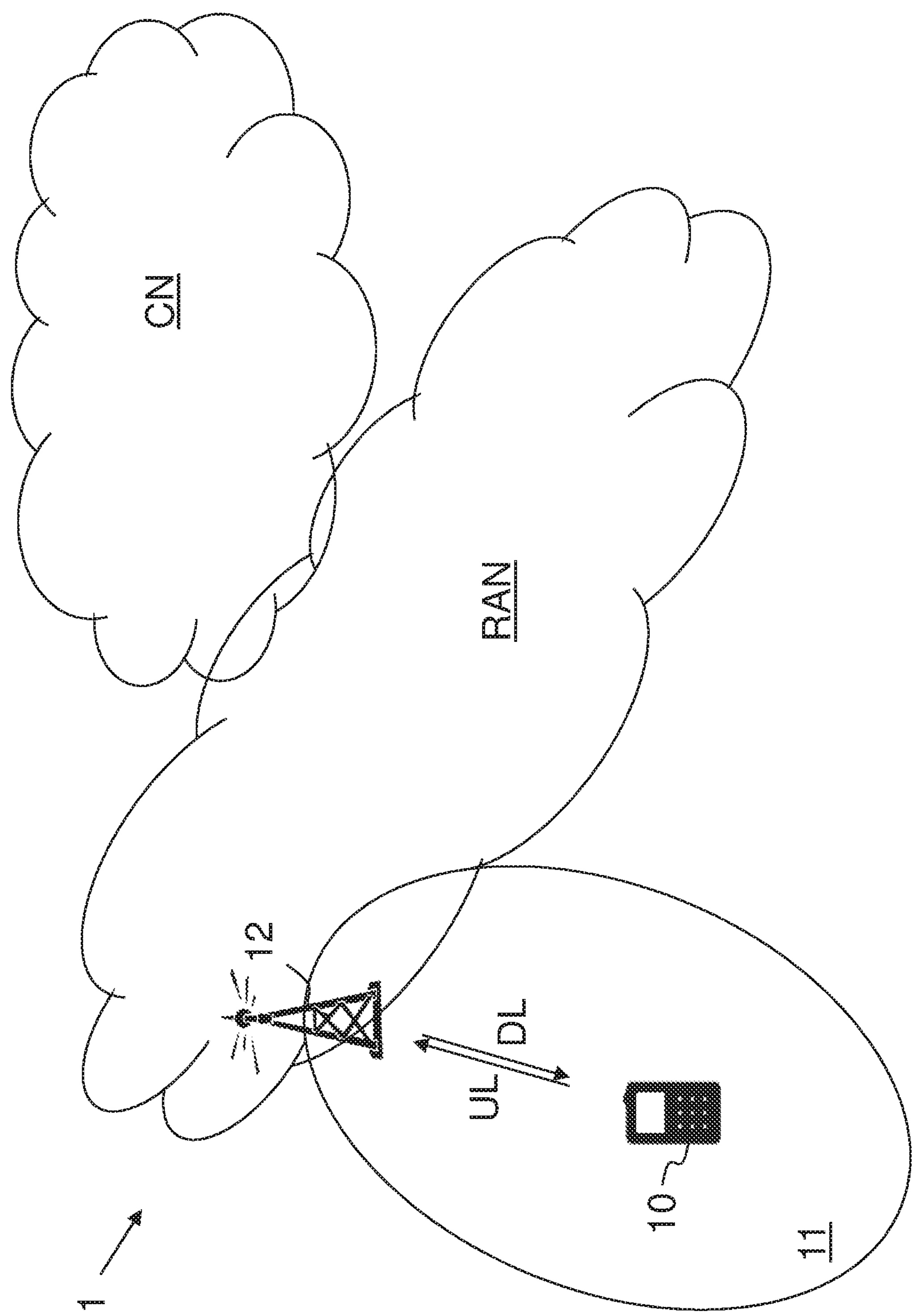
FIG. 3 is a schematic overview depicting a wireless communication network according to embodiments herein.

Embodiments herein relate to wireless communication networks in general. FIG. 3 is a schematic overview depicting a wireless communication network 1. The wireless communication network 1 comprises one or more RANs and one or more CNs. The wireless communication network 1 may use one or a number of different technologies. Embodiments herein relate to recent technology trends that are of particular interest in a 5G context such as NR; however, embodiments are also applicable in further development of existing wireless communication systems such as e.g. Wideband Code Division Multiple Access (WCDMA) and LTE.

In the wireless communication network 1, wireless devices e.g. a wireless device 10 such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "wireless device" is a non-limiting term which means any terminal, wireless communication terminal, user equipment (UE), Internet of things (IoT) operable device, Machine Type Communication (MTC) device, Device to Device (D2D) terminal, or node e.g. smart phone, laptop, mobile phone, sensor, relay, mobile tablets or even a small base station capable of communicating using radio communication with a radio network node within an area served by the radio network node.

The wireless communication network 1 comprises a radio network node 12 providing radio coverage over a geographical area, a first service area 11, of a first radio access technology (RAT), such as NR, LTE, or similar. The radio network node 12 may be a transmission and reception point e.g. a radio network node such as a Wireless Local Area Network (WLAN) access point or an Access Point Station (AP STA), an access node, an access controller, a base station, e.g. a radio base station such as a gNodeB (gNB), an evolved Node B (eNB, eNodeB), a base transceiver station, a radio remote unit, an Access Point Base Station, a base station router, a transmission arrangement of a radio base station, a stand-alone access point or any other network unit or node capable of communicating with a wireless device within the area served by the radio network node 12 depending e.g. on the first radio access technology and terminology used. The radio network node 12 may alternatively or additionally be a controller node or a packet processing node such as a radio controller node or similar. The radio network node may be referred to as a serving radio network node wherein the first service may be referred to as a serving cell, and the serving network node communicates with the wireless device 10 in form of DL transmissions to the wireless device 10 and UL transmissions from the wireless device 10. It should be noted that a service area may be denoted as cell, beam, beam group or similar to define an area of radio coverage.

The wireless device 10 may be configured for using a first carrier in the UL and/or a second carrier. The first carrier may have a different coverage level than the second carrier. When the wireless device 10 is configured to also use the second carrier in the UL, such as using a SUL carrier, there may be two options for performing an access procedure to the radio network node 12. Either the wireless device 10 performs the access procedure by transmitting a preamble, e.g. RA preamble, on the first carrier or on the second carrier.

Embodiments herein identify which carrier is used to transmit the preamble and thereby avoid ambiguities for the wireless device 10 to understand if its preamble transmission is detected. This may e.g. be done by differentiating a RAR window so that one or more first subframes or slots are used for RAR for preambles transmitted on a first carrier, such as a NR carrier, and the rest, i.e. one or more second subframes or slots, are used for RARs for preambles transmitted on a second carrier, such as a SUL carrier. By this arrangement, it is possible to identify if the RAR regards a preamble that is transmitted on the first carrier or the second carrier even if this cannot be deduced from the RAPID and RA-RNTI. Other examples are disclosed below.

Figure 4:
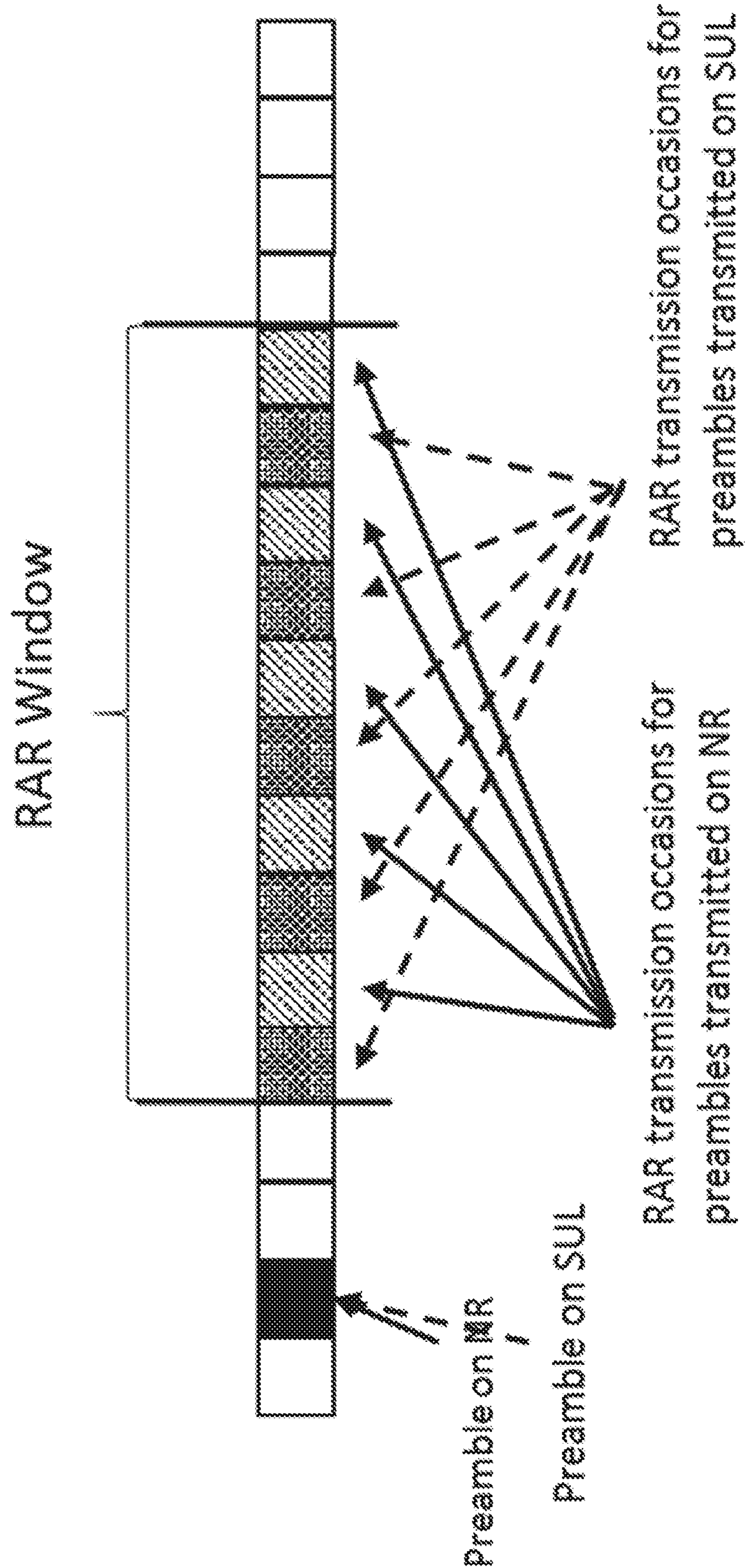
FIG. 4 shows a diagram according to an example embodiment for handling RAR.

FIG. 4 discloses one of a various embodiments for handling RAR to indicate the carrier out of the first carrier and the second carrier the preamble was received on. The second carrier being exemplified as a SUL carrier and the first carrier is exemplified as a NR carrier in this illustrated example.

In a first embodiment, the RAR window is split for accesses on the SUL carrier and the NR carrier separately. After the transmission of the preamble, the wireless device 10 may monitor any RAR transmission which is intended for the wireless device 10 within a RAR window. This RAR must be addressed to the wireless device 10 with the corresponding RA-RNTI. For RACH accesses with the same preamble on the different carriers, the radio network node 12 may be able to successfully receive at least one RACH access on the SUL carrier and at least one RACH access on the NR carrier, at the same time.

The RAR window may be split according to several options.

In a first option, the RAR window is split in a way that there are no overlapping positions of the time slots between the two carriers. The split of time slots may be equal or unequal based on RACH load distribution between the two carriers. When the wireless device 10 receives a RAR on a certain position in time i.e. a certain subframe or slot, the wireless device 10 can deduce if the RAR is a response to a preamble transmitted on the NR or SUL carrier depending on when the RAR is transmitted in time, i.e. based on the transmission of the RAR.

It is shown in FIG. 4 an illustration of a RAR window split where some subframes or slots are reserved for responses to preambles transmitted on the first carrier such as the NR carrier and the others for responses to preambles transmitted on the second carrier such as the SUL carrier. The first and second carriers may differ in frequency band and/or coverage.

In a second option, the RAR window is split in a way to allow overlapping positions between the two carriers, meaning that the radio network node 12 may multiplex two RARs in a Medium Access Control (MAC) Packet Data Unit (PDU) on those positions, where one RAR is intended for the responses of RACH accesses initiated on the SUL carrier, while another RAR is intended to respond RACH accesses transmitted on the NR carrier. These RACH accesses use the same PRACH preamble. In this option, the system can better utilize the RACH resources in the time domain. Two additional indicators may be introduced in the MAC sub-header, to indicate whether RAR for each carrier is present or absent. There may be several examples on how to implement the indicators. In one example, the indicators can be added to an E/T/RAPID MAC subheader, where a bitmap e.g. one byte bitmap, is appended at the end of subheader, or located at the beginning of the subheader. There are only two bits used, and the other 6 bits are reserved for other purposes. In the second example, one R bit in the RAR message may be used. In the existing RAR format, e.g., LTE RAR format, the first bit is the R bit. The value "0" of R bit in the first RAR message may mean that there is no other RAR message, while the value "1" of R bit in the first RAR message may mean there will be one more RAR message. Additionally, on the overlapping positions, the wireless device 10 also needs to know the mapping between the RARs and the carriers. There are some examples on how to identify the mapping e.g. using RA-RANTI for carriers.

In the second embodiment, there is no split performed on the RAR window. This means that the radio network node 12 transmits only a single RAR message comprising two PUSCH grants, one PUSCH grant for the second carrier and another one PUSCH grant for the first carrier. Correspondingly, there may be also two T-C-RNTIs and two RAR timing advance (TA) commands carried in this single RAR message. Same as the previous embodiment, the wireless device 10 is also able to identify the association between the grant/TC-RNTI/TA-command and the carrier. It is also possible that the radio network node 12 multiplexes two separate RARs in a same MAC PDU. In this case, the wireless device 10 doesn't have knowledge on when there may be two RARs multiplexed in advance. While in the first embodiment, the wireless device 10 has such knowledge via the signaling of the RAR window split.

In some embodiments, the similar mechanisms that are described in previous embodiments can be applicable to other scenarios where there are multiple uplink carriers, or multiple cells, or multiple Transmission and Reception points (TRP) integrated together for a coordinated commination. They may share the same PRACH resource pool, e.g., PRACH preambles. The radio network node 12 may need to acknowledge multiple RACH accesses that use the same preamble and associated with the same RA-RNTI, at the same time.

Figure 5:
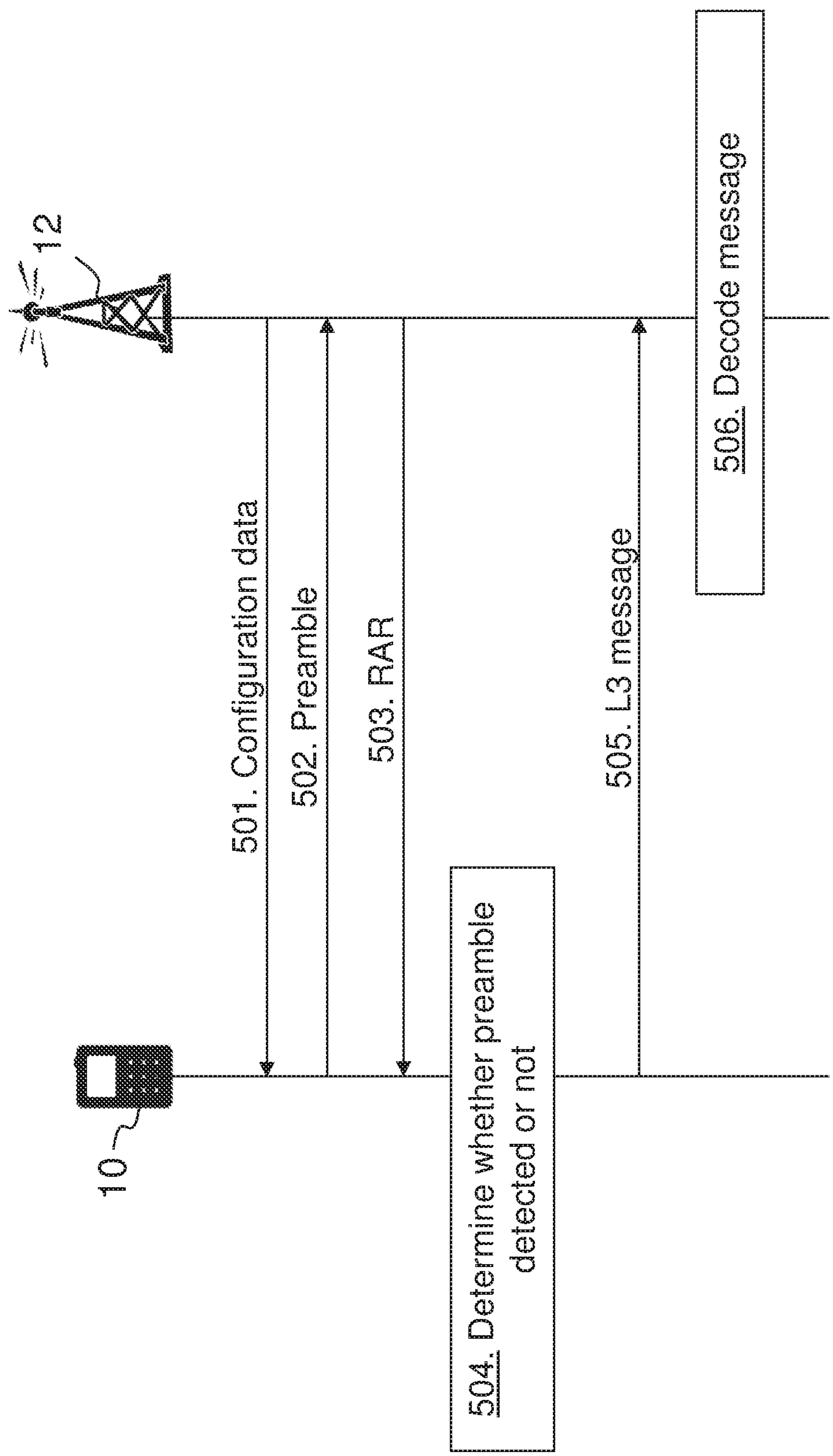
FIG. 5 shows a combined flowchart and signalling scheme according to embodiments herein.

FIG. 5 is a combined flowchart and signaling scheme according to embodiments herein.

Action 501. The radio network node 12 may configure the wireless device 10 by transmitting configuration data indicating the configuration of RAR window split to the wireless device 10 via e.g. Radio Resource Control (RRC) messages. The configuration of a RAR window split may be also signaled and/or updated via a MAC Control Element (CE), PDCCH command or other L1 or L2 signaling alternatives. In order to save the control signaling overhead, a bitmap may be used to reflect the mapping between the RAR window positions and the carriers. The window position or time position of each bit corresponds to a specific position within the RAR window (the position may be a sub-frame, slot, or mini-slot, or other time unit to reflect the RAR transmission opportunity).

Action 502. The wireless device 10 transmits a preamble during a random access procedure. The wireless device 10 is configured with a first and/or a second carrier for UL transmissions. The preamble used may be independent of the carrier used in the UL. The wireless device 10 may select one out of the 64-Z PRACH contention-based sequences (where Z is the Number allocation for contention-free preambles allocated by the radio network node 12). The set of contention-based signatures may further be subdivided into two subgroups, so that the choice of preamble can carry one bit of information relating to the amount of transmission resource needed to transmit Message 3.

Action 503. The network node 12 responds to the wireless device 10 with the RAR. The RAR carries an indication explicitly or implicitly indicating what carrier the preamble was received on. According to embodiments herein the RAR transmission time or RAR resource used is based on the carrier upon which the preamble is received on. As an example, one or more slots for RAR may be reserved for responses to preambles transmitted on the first carrier such as the NR carrier and the others for responses to preambles transmitted on the second carrier such as the SUL carrier.

Furthermore, the RAR may convey the identity of the detected preamble called RAPID, a timing alignment instruction to synchronize subsequent uplink transmissions from the wireless device 10, an initial uplink resource grant for transmission of the Step 3 message, and an assignment of a temporary C-RNTI, which may or may not be made permanent as a result of the next step—contention resolution. The RAR may also be scrambled with the Random access Radio Network Temporary Identifier (RA-RNTI) when the RAR was detected and indicates the PRACH resource when the preamble was transmitted. The wireless device 10 expects to receive the RAR within a time window, of which the start and end are configured by the radio network node 12 and broadcast as part of the cell-specific system information. If the wireless device 10 does not receive a RAR within the configured time window, the wireless device 10 selects another sequence to be transmitted again.

Action 504. The wireless device 10 determines based on the position in time the RAR is received that the transmitted preamble of a carrier has been detected or not at the radio network node 12. For overlapping positions, the wireless device 10 may receive acknowledgement for two carriers at the same time, so, the Uplink grants, TC-RNTI, and TA values may be provided for the two carriers at the same time. This can be done either in one single RAR (using a new format) or in two multiplexed RAR messages. Therefore, the wireless device 10 may identify which one is for which carrier (it may also be so that the radio network node 12 only sends one RAR and must be able to indicate which carrier it means). Embodiments herein may use a bitmap with 2 bits (or 8 bits for byte alignment purposes). One bit may indicate whether the SUL carrier info is present or absent. Another bit may indicate whether the NR carrier info is present or absent. There may be also other examples, such as define a fixed order for RAR reception. The first received RAR is for SUL; while the second received RAR is for NR.

Action 505. The wireless device 10 may then transmit a message such as a layer 3 message to the radio network node 12. This message is the first scheduled uplink transmission on the PUSCH and may make use of HARQ. It is addressed to the temporary C-RNTI allocated in the RAR.

Action 506. The transmission of the wireless device 10 may then successfully be decoded at the radio network node 12.

Figure 6:
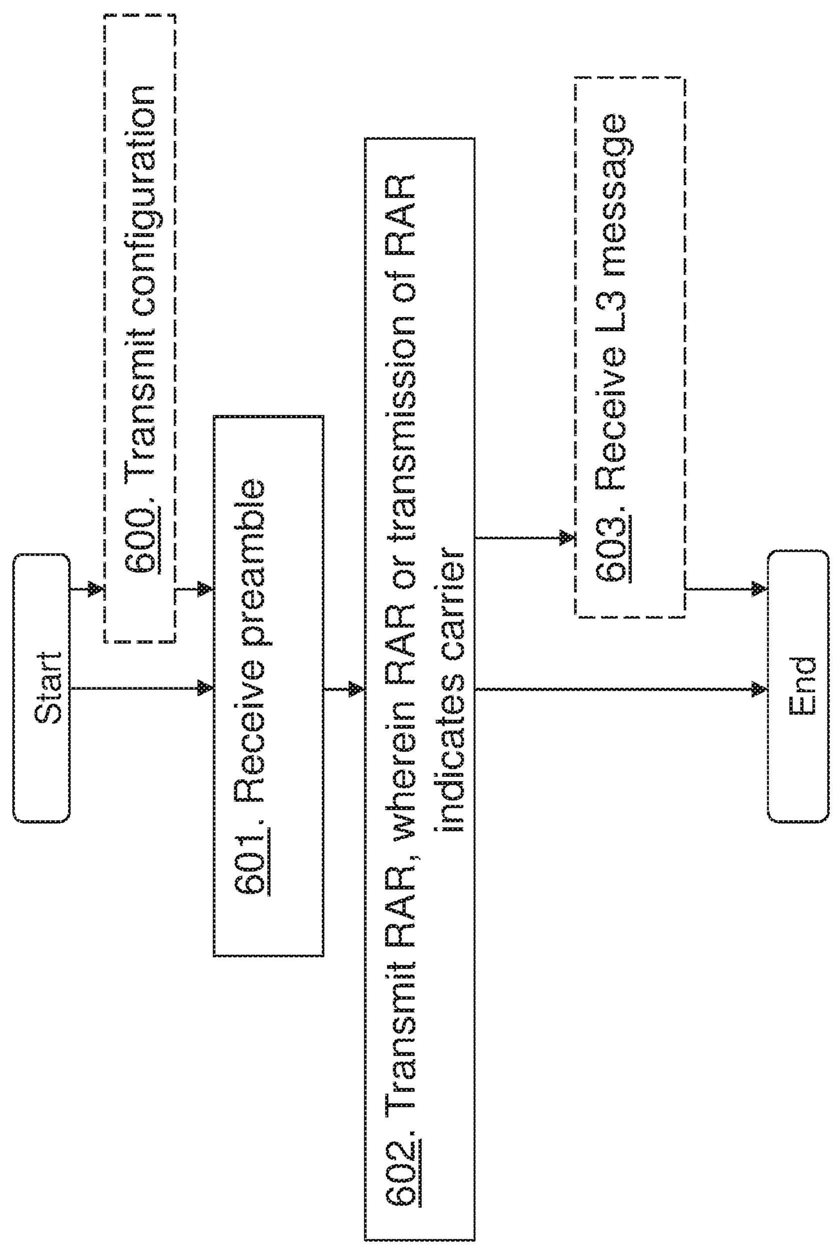
FIG. 6 shows a schematic flowchart depicting a method performed by a radio network node according to embodiments herein.

The method actions performed by the radio network node 12 for handling communication, e.g. handling access procedure from the wireless device 10, of the wireless device 10 in the wireless communication network 1 according to embodiments herein will now be described with reference to a flowchart depicted in FIG. 6. The actions do not have to be taken in the order stated below, but may be taken in any suitable order. Actions performed in some embodiments are marked with dashed boxes. The first carrier and the second carrier may be configured with one or more same preambles of the random access procedure and/or a same PRACH configuration.

Action 600. The radio network node 12 may transmit a configuration of the RAR and how the RAR or the transmission of the RAR indicates the carrier the preamble was received on at the radio network node 12.

Action 601. The radio network node 12 receives from the wireless device 10, the preamble of a random access procedure on the first carrier or the second carrier e.g. on the first or the second carrier. The first carrier may be a carrier for NR transmissions and the second carrier may be for SUL transmissions.

Action 602. The radio network node 12 then transmits to the wireless device 10, the RAR, wherein the RAR or transmission of the RAR indicates the carrier out of the first carrier and the second carrier the preamble was received on. The transmission of the RAR may indicate the carrier by the RAR being transmitted in a first time position reserved for the first carrier or in a second time position reserved for the second carrier. The RAR may indicate the carrier out of the first carrier and the second carrier the preamble was received on by comprising one out of two temporary Cell Radio Network Temporary Identifiers and/or one time alignment commands out of two time alignment commands each being associated with a respective carrier. The RAR may indicate the carrier by comprising one or more indicators, indicating the carrier, in a MAC sub-header or payload. The transmission of the RAR may indicate the carrier by multiplexing RAR messages of the different carriers in a preconfigured manner. E.g. the radio network node 12 may transmit the RAR in the first time position, e.g. subframe or slot, reserved for the first carrier or in the second time position reserved for the second carrier. Alternatively or additionally, the radio network node 12 may multiplex the RARs of the different carriers in a MAC PDU. Alternatively or additionally, the radio network node 12 may transmit one PUSCH grant for the second carrier and another one PUSCH grant for the first carrier. Correspondingly, there may be also two T-C-RNTIs and two RAR TA commands carried in one single RAR message. E.g. following a predefined order, such as, the first T-C-RNTI and/or TA command is for SUL carrier, while the second ones are for non-SUL carrier.

Action 603. The radio network node 12 may then receive a layer 3 (L3) message from the wireless device 10. The layer 3 message is addressed to the temporary C-RNTI allocated in the RAR.

Figure 7:
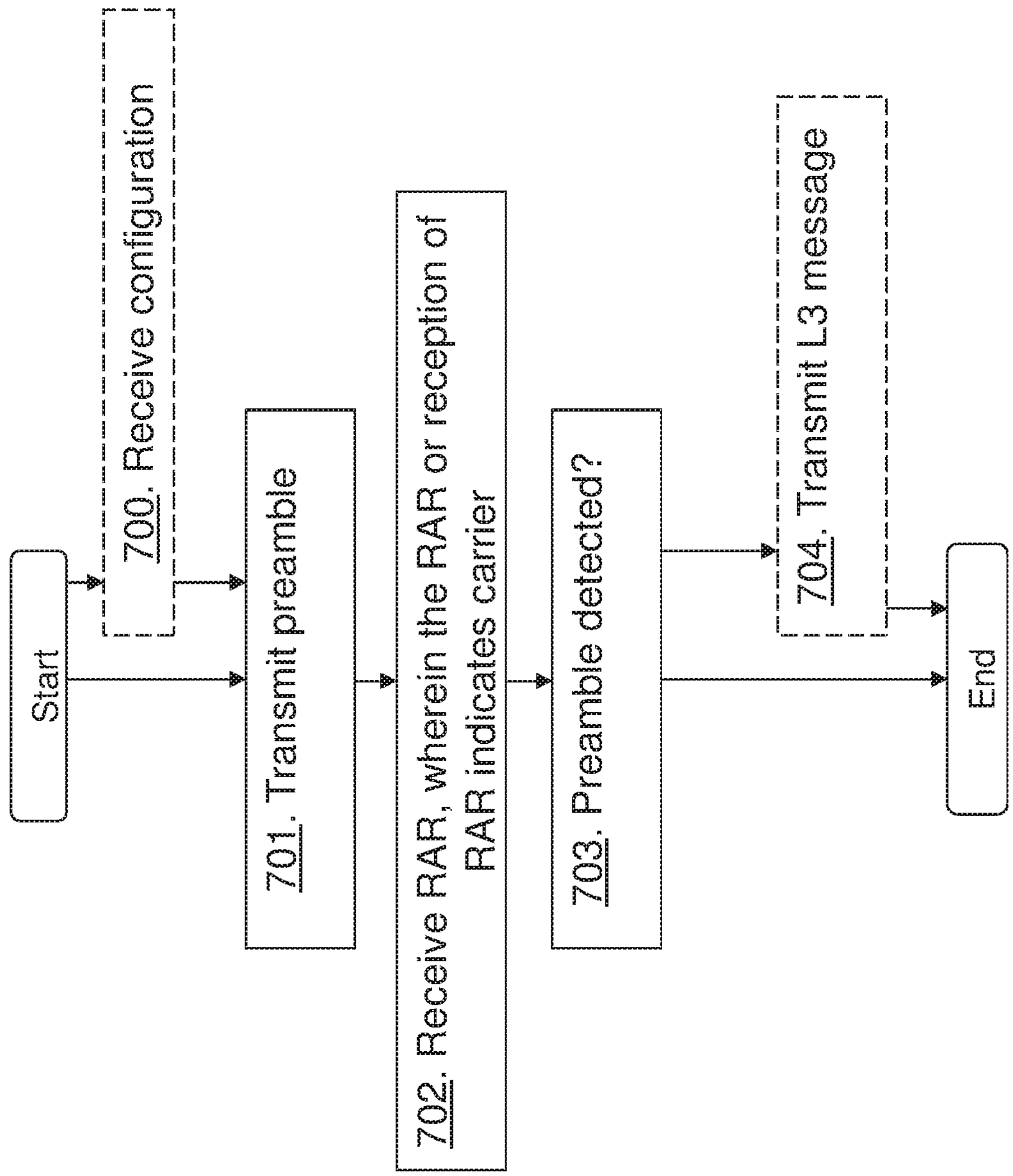
FIG. 7 shows a schematic flowchart depicting a method performed by a wireless device according to embodiments herein.

The method actions performed by the wireless device 10 for handling communication of the wireless device 10 in the wireless communication network 1 according to embodiments herein will now be described with reference to a flowchart depicted in FIG. 7. The actions do not have to be taken in the order stated below, but may be taken in any suitable order. Actions performed in some embodiments are marked with dashed boxes. The first carrier and the second carrier may be configured with one or more same preambles of the random access procedure and/or a same PRACH configuration.

Action 700. The wireless device 10 may receive the configuration of the RAR and how the RAR or the reception of the RAR indicates the carrier the preamble was received on at the radio network node 12.

Action 701. The wireless device 10 transmits to the radio network node 12 the preamble of the random access procedure on the first carrier or the second carrier e.g. during the random access procedure. The wireless device 10 is configured with a first and/or second carrier for UL transmissions. The first carrier may be a carrier for NR transmissions and the second carrier may be for one or more SUL transmissions.

Action 702. The wireless device 10 then receives from the radio network node 12, the RAR, wherein the RAR or the reception of the RAR indicates the carrier out of the first carrier and the second carrier the preamble was received on at the radio network node 12. The reception of the RAR may indicate the carrier by the RAR being received in the first time position reserved for the first carrier or the RAR being received in the second time position reserved for the second carrier. The RAR may indicate the carrier out of the first carrier and the second carrier the preamble was received on by comprising one out of two temporary Cell Radio Network Temporary Identifiers and/or one time alignment command out of two time alignment commands each being associated with a respective carrier. The RAR may indicate the carrier by comprising one or more indicators, indicating the carrier, in the MAC sub-header or payload. The reception of the RAR may indicate the carrier by demultiplexing RAR messages of the different carriers in a preconfigured manner. E.g. the RAR may be received in the first time position reserved for the first carrier or in the second time position reserved for the second carrier. Alternatively or additionally, the RAR may be received and de-multiplexed in the MAC PDU, wherein the multiplexing is known at the wireless device. Alternatively or additionally, the wireless device may identify the association between the grant/TC-RNTI/TA-command and the carrier.

Action 703. The wireless device 10 determines whether the preamble has been detected or not at the radio network node 12 taking the received RAR and/or the reception of the RAR into account e.g. based on the indication which carrier the RAR is indicating or related to.

Action 704. The wireless device may then transmit the L3 message to the radio network node 12. This message is the first scheduled uplink transmission on the PUSCH and is addressed to the temporary C-RNTI allocated in the RAR.

Figure 8:
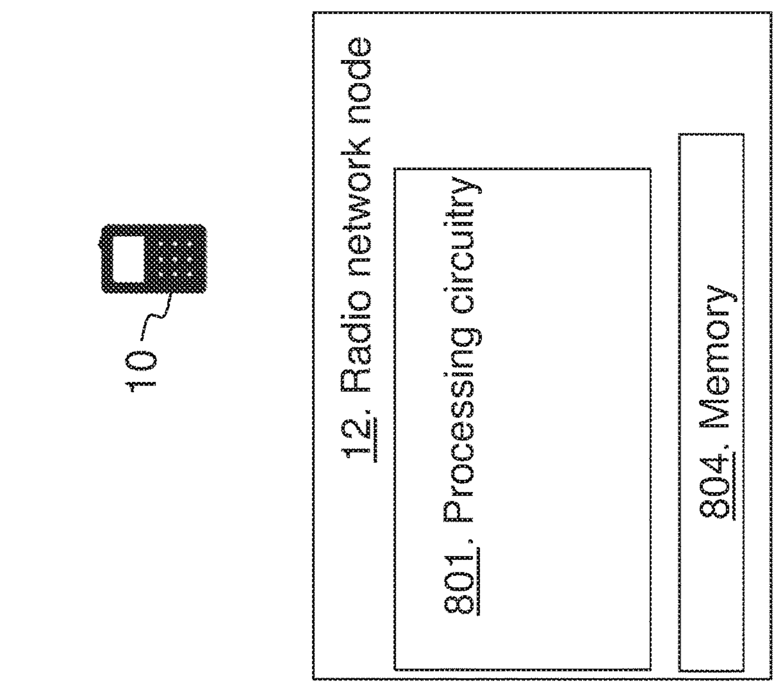
FIG. 8 is a block diagram depicting a radio network node according to embodiments herein.
Figure 8:
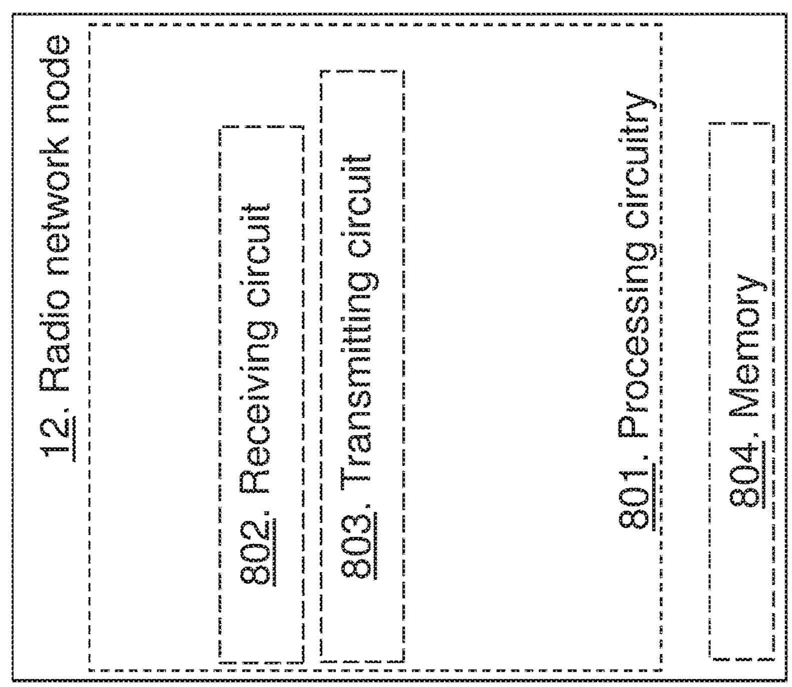
Figure 8:
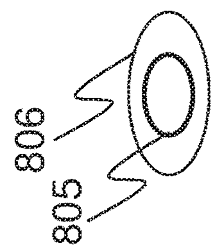

FIG. 8 is a block diagram depicting the radio network node 12 for handling communication of the wireless device 10 in the wireless communication network 1 according to embodiments herein.

The radio network node 12 may comprise processing circuitry 801, e.g. one or more processors, configured to perform the methods herein.

The radio network node 12 may comprise a receiving circuit 802, a receiver or a transceiver. The radio network node 12, the processing circuitry 801, and/or the receiving circuit 1302 is configured to receive, from the wireless device 10, the preamble of the random access procedure on the first carrier or the second carrier.

The radio network node 12 may comprise a transmitting circuit 803, e.g. a transmitter or the transceiver. The radio network node 12, the processing circuitry 801, and/or the transmitting circuit 803 is configured to transmit the RAR, to the wireless device 10, the RAR. The RAR or transmission of the RAR indicates the carrier out of the first carrier and the second carrier the preamble was received on. E.g. transmit the RAR on the position reserved for the first carrier or the second carrier. The transmission of the RAR may thus indicate the carrier by the RAR being transmitted in the first time position reserved for the first carrier or in the second time position reserved for the second carrier. The first carrier may be a carrier for NR transmissions and the second carrier may be for a SUL transmission. The radio network node 12, the processing circuitry 801, and/or the transmitting circuit 803 may be configured to transmit the configuration of the RAR and how the RAR or the transmission of the RAR indicates the carrier the preamble was received on at the radio network node. The RAR may indicate the carrier out of the first carrier and the second carrier the preamble was received on by comprising one out of two temporary Cell Radio Network Temporary Identifiers and/or one time alignment commands out of two time alignment commands each being associated with a respective carrier. The RAR may indicate the carrier by comprising one or more indicators, indicating the carrier, in a MAC sub-header or payload. The transmission of the RAR may indicate the carrier by multiplexing RAR messages of the different carriers in a preconfigured manner.

The radio network node 12 further comprises a memory 804. The memory comprises one or more units to be used to store data on, such as signal strengths or qualities, IDs of radio network nodes, preambles, RAR information, applications to perform the methods disclosed herein when being executed, and similar.

The methods according to the embodiments described herein for the radio network node 12 are respectively implemented by means of e.g. a computer program product 805 or a computer program, comprising instructions, i.e., software code portions, which, when executed on at least one processor, cause the at least one processor to carry out the actions described herein, as performed by the radio network node 12. The computer program 805 may be stored on a computer-readable storage medium 806, e.g. a disc, a universal serial bus (USB) stick or similar. The computer-readable storage medium 806, having stored thereon the computer program product, may comprise the instructions which, when executed on at least one processor, cause the at least one processor to carry out the actions described herein, as performed by the radio network node 12. In some embodiments, the computer-readable storage medium may be a transitory or a non-transitory computer-readable storage medium.

Figure 9:
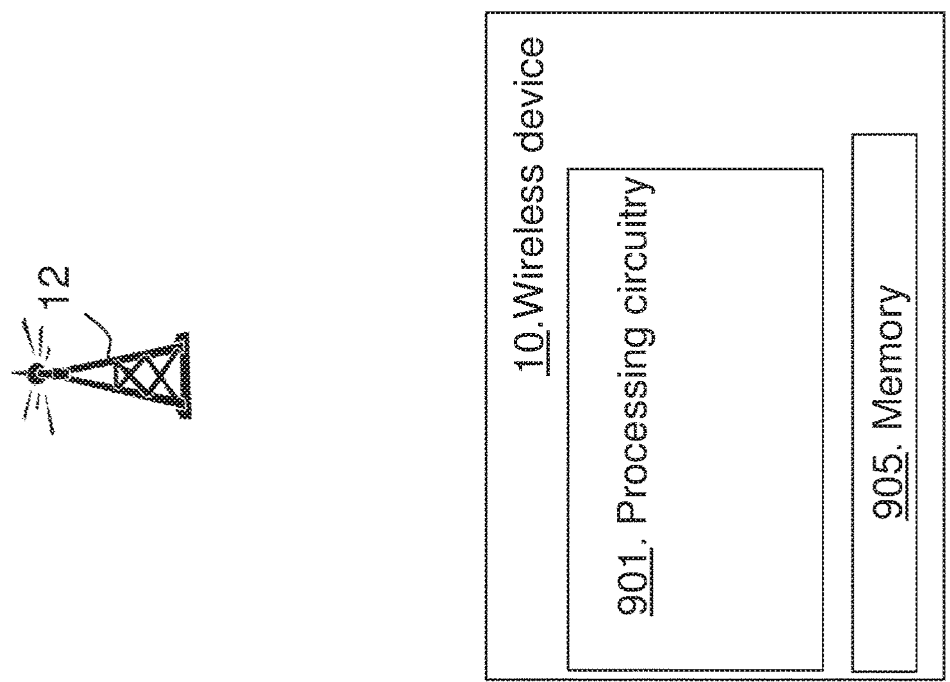
FIG. 9 is a block diagram depicting a wireless device according to embodiments herein.
Figure 9:
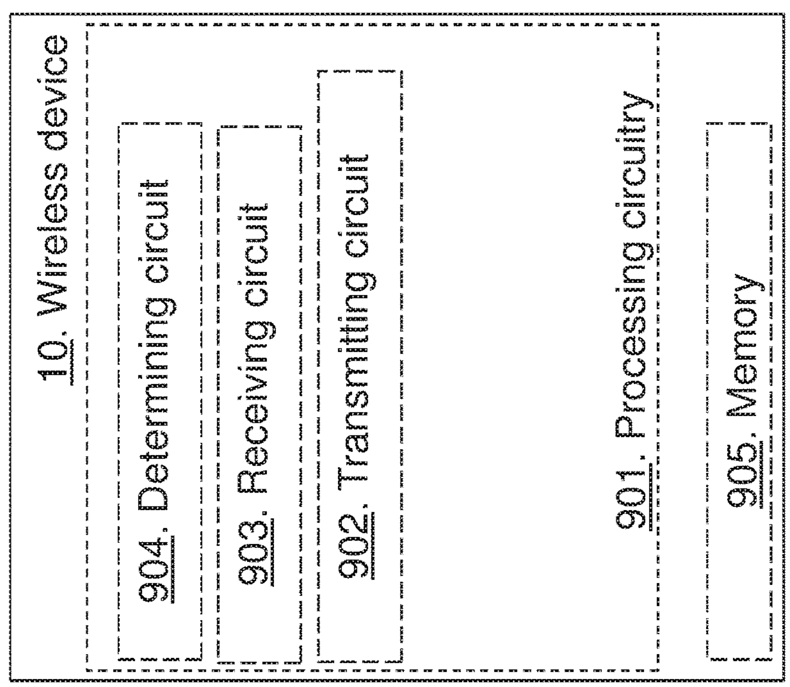
Figure 9:
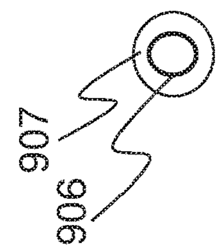

FIG. 9 is a block diagram depicting the wireless device 10 for handling communication of the wireless device in the wireless communication network according to embodiments herein.

The wireless device may comprise processing circuitry 901, such as one or more processors, configured to perform methods herein.

The wireless device 10 may comprise a transmitting circuit 902, e.g. a transmitter or a transceiver. The wireless device, the processing circuitry 901, and/or the transmitting circuit 902 is configured to transmit the preamble, to the radio network node 12, of the random access procedure on the first carrier or the second carrier.

The wireless device 10 may comprise a receiving circuit 903, e.g. a receiver or a transceiver. The wireless device 10, the processing circuitry 901, and/or the receiving circuit 903 is configured to receive from the radio network node 12, the RAR. The RAR or the reception of the RAR indicates the carrier out of the first carrier and the second carrier the preamble was received on at the radio network node 12.

The wireless device 10 may comprise a determining circuit 904. The wireless device 10, the processing circuitry 901, and/or the determining circuit 904 is configured to determine whether the preamble has been detected at the radio network node or not taking the received RAR and/or the reception of the RAR into account e.g. based on the received RAR.

The wireless device 10, the processing circuitry 901, and/or the receiving circuit 903 may be configured to receive the RAR in the first time position reserved for the first carrier or in the second time position reserved for the second carrier.

The wireless device 10, the processing circuitry 901, and/or the receiving circuit 903 may be configured to receive the configuration of the RAR and how the RAR or the reception of the RAR indicates the carrier the preamble was received on at the radio network node 12. The wireless device 10, the processing circuitry 901, and/or the receiving circuit 903 may be configured to de-multiplex the RAR in the MAC PDU, wherein the multiplexing, at the radio network node 12, of the RAR is known at the wireless device.

The wireless device 10, the processing circuitry 901, and/or the receiving circuit 903 may be configured to receive one uplink grant for the second carrier or another uplink grant for the first carrier.

The wireless device 10, the processing circuitry 901, and/or the determining circuit 904 may be configured to determine, wherein the first temporary Cell Radio Network Temporary Identifiers and the first RAR TA command are carried in the RAR associated with one of the carriers, identify, as pre-configured, the association between the grant/TC-RNTI/TA-command and the carrier.

The wireless device 10, the processing circuitry 901, and/or the receiving circuit 903 may be configured to receive the configuration of the RAR defining how the RAR indicates the carrier the preamble was received on at the radio network node.

The wireless device 10 further comprises a memory 905. The memory comprises one or more units to be used to store data on, such as signal strengths or qualities, IDs of radio network nodes, preambles, RAR information, applications to perform the methods disclosed herein when being executed, and similar.

The methods according to the embodiments described herein for the wireless device 10 are respectively implemented by means of e.g. a computer program product 906 or a computer program, comprising instructions, i.e., software code portions, which, when executed on at least one processor, cause the at least one processor to carry out the actions described herein, as performed by the wireless device 10. The computer program product 906 may be stored on a computer-readable storage medium 907, e.g. a disc, a USB stick or similar. The computer-readable storage medium 907, having stored thereon the computer program product, may comprise the instructions which, when executed on at least one processor, cause the at least one processor to carry out the actions described herein, as performed by the wireless device 10. In some embodiments, the computer-readable storage medium may be a transitory or a non-transitory computer-readable storage medium.

In some embodiments a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

The embodiments are described for 5G or NR. However the embodiments are applicable to any RAT or multi-RAT systems, where the wireless device receives and/or transmit signals (e.g. data) e.g. Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

According to an aspect the object is achieved by providing a method performed by a radio network node for handling communication of a wireless device in a wireless communication network. The radio network node receives a preamble from the wireless device on a first or a second carrier. The radio network node then transmits a RAR indicating which carrier the preamble was received on. E.g. the radio network node may transmit the RAR in a first time position reserved for the first carrier or in a second time position reserved for the second carrier.

According to another aspect the object is achieved by providing a method performed by a wireless device for handling for handling communication of the wireless device in a wireless communication network. The wireless device transmits a preamble to a radio network node on a first or a second carrier. The wireless device then receives a RAR indicating which carrier the preamble was received on at the radio network node. The wireless device determines whether the preamble has been detected or not based on the received RAR.

According to yet another aspect the object is achieved by providing a radio network node for handling communication of a wireless device in a wireless communication network. The radio network node is configured to receive a preamble from the wireless device on a first or a second carrier. The radio network node is further configured to transmit a RAR indicating which carrier the preamble was received on. E.g. the radio network node may be configured to transmit the RAR in a first time position reserved for the first carrier or in a second time position reserved for the second carrier.

According to another aspect the object is achieved by providing a wireless device for handling for handling communication of the wireless device in a wireless communication network. The wireless device is configured to transmit a preamble to a radio network node on a first or a second carrier. The wireless device is further configured to receive a RAR indicating which carrier the preamble was received on at the radio network node. The wireless device is configured to determine whether the preamble has been detected or not based on the received RAR.

In an embodiment 1, it is provided a method performed by a radio network node for handling communication of a wireless device in a wireless communication network. The method comprises:

- receiving a preamble from the wireless device on a first or a second carrier;
- transmitting a RAR indicating which carrier the preamble was received on.

In an embodiment 2 the method according to embodiment 1 wherein transmitting the RAR comprises

- transmitting the RAR in a first time position reserved for the first carrier or in a second time position reserved for the second carrier.

In an embodiment 3 the method according to embodiment 1 or embodiment 2, wherein transmitting the RAR comprises

- multiplexing the RARs of the different carriers in a MAC PDU.

In an embodiment 4 the method according to embodiment 1-2 or embodiment 3, wherein transmitting the RAR comprises

- transmitting one uplink grant for the second carrier and another uplink grant for the first carrier.

In an embodiment 5 the method according to embodiment 1-3 or embodiment 4, wherein two temporary Cell Radio Network Temporary Identifiers and two RAR TA commands are carried in the RAR, associated with a respective carrier.

In an embodiment 6 the method according to embodiment 1-4 or embodiment 5, further comprising

- transmitting a configuration on how the RAR indicates the carrier the preamble was received on at the radio network node.

In an embodiment according to any of the embodiments, wherein the carriers are integrated together for a coordinated commination, the radio network node may acknowledge these by transmitting the RAR indicating which carrier, e.g. send RARs indicating a respective carrier to a number of receiving TRPs at the same time.

In an embodiment 7, it is provided a method performed by a wireless device for handling for handling communication of the wireless device in a wireless communication network. The method comprises

- transmitting a preamble to a radio network node on a first or a second carrier;
- receiving a RAR indicating which carrier the preamble was received on at the radio network node; and
- determining whether the preamble has been detected at the radio network node or not based on the received RAR.

In an embodiment 8 the method according to embodiment 7 wherein receiving the RAR comprises receiving the RAR in a first time position reserved for the first carrier or in a second time position reserved for the second carrier.

In an embodiment 9 the method according to embodiment 7 or embodiment 8, wherein receiving the RAR further comprises de-multiplexing the RAR in the MAC PDU, wherein multiplexing of the RAR is known at the wireless device.

In an embodiment 10 the method according to embodiment 7-8 or embodiment 9, wherein receiving the RAR comprises receiving one uplink grant for the second carrier or another uplink grant for the first carrier.

In an embodiment 11 the method according to embodiment 7-9 or embodiment 10, wherein a first temporary Cell Radio Network Temporary Identifiers and a first RAR time alignment command are carried in the RAR, associated with one of the carriers, and the wireless device identifies the carrier from the Cell Radio Network Temporary Identifiers and the first RAR time alignment command.

In an embodiment 12 the method according to embodiment 7-10 or embodiment 11, further comprising

- receiving a configuration of the RAR and how the RAR indicates the carrier the preamble was received on at the radio network node.

Figure 10:
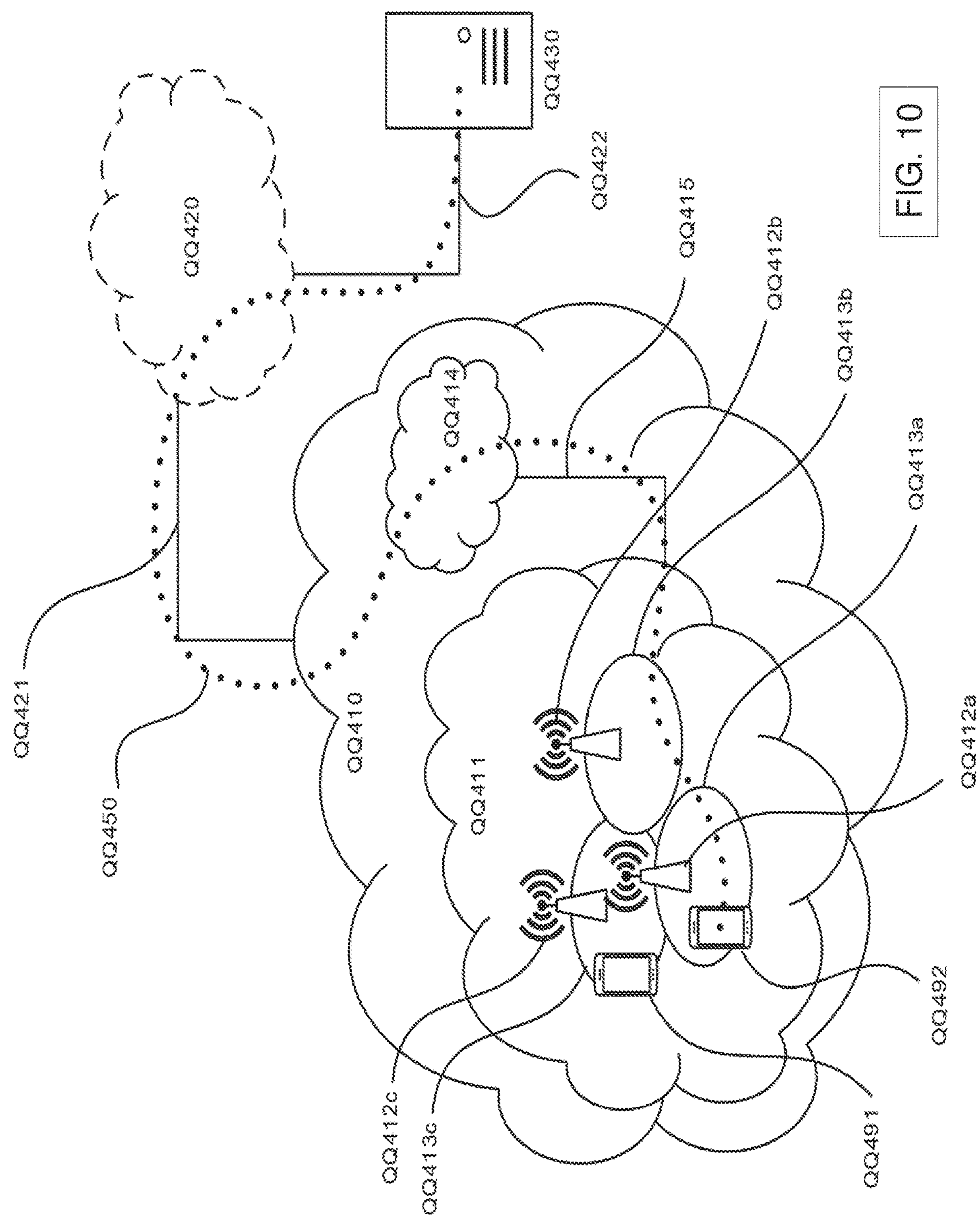
FIG. 10 shows a telecommunication network connected via an intermediate network to a host computer in accordance with some embodiments.

FIG. 10 shows a telecommunication network connected via an intermediate network to a host computer in accordance with some embodiments.

With reference to FIG. 10, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412*a*, QQ412*b*, QQ412*c*, such as NBs, eNBs, gNBs or other types of wireless access points being examples of the radio network node 12 above, each defining a corresponding coverage area QQ413*a*, QQ413*b*, QQ413*c*. Each base station QQ412*a*, QQ412*b*, QQ412*c* is connectable to core network QQ414 over a wired or wireless connection QQ415. A first UE QQ491 located in coverage area QQ413*c* is configured to wirelessly connect to, or be paged by, the corresponding base station QQ412*c*. A second UE QQ492 in coverage area QQ413*a* is wirelessly connectable to the corresponding base station QQ412*a*. While a plurality of UEs QQ491, QQ492 are illustrated in this example being examples of the wireless device 10 above, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 10 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 11:
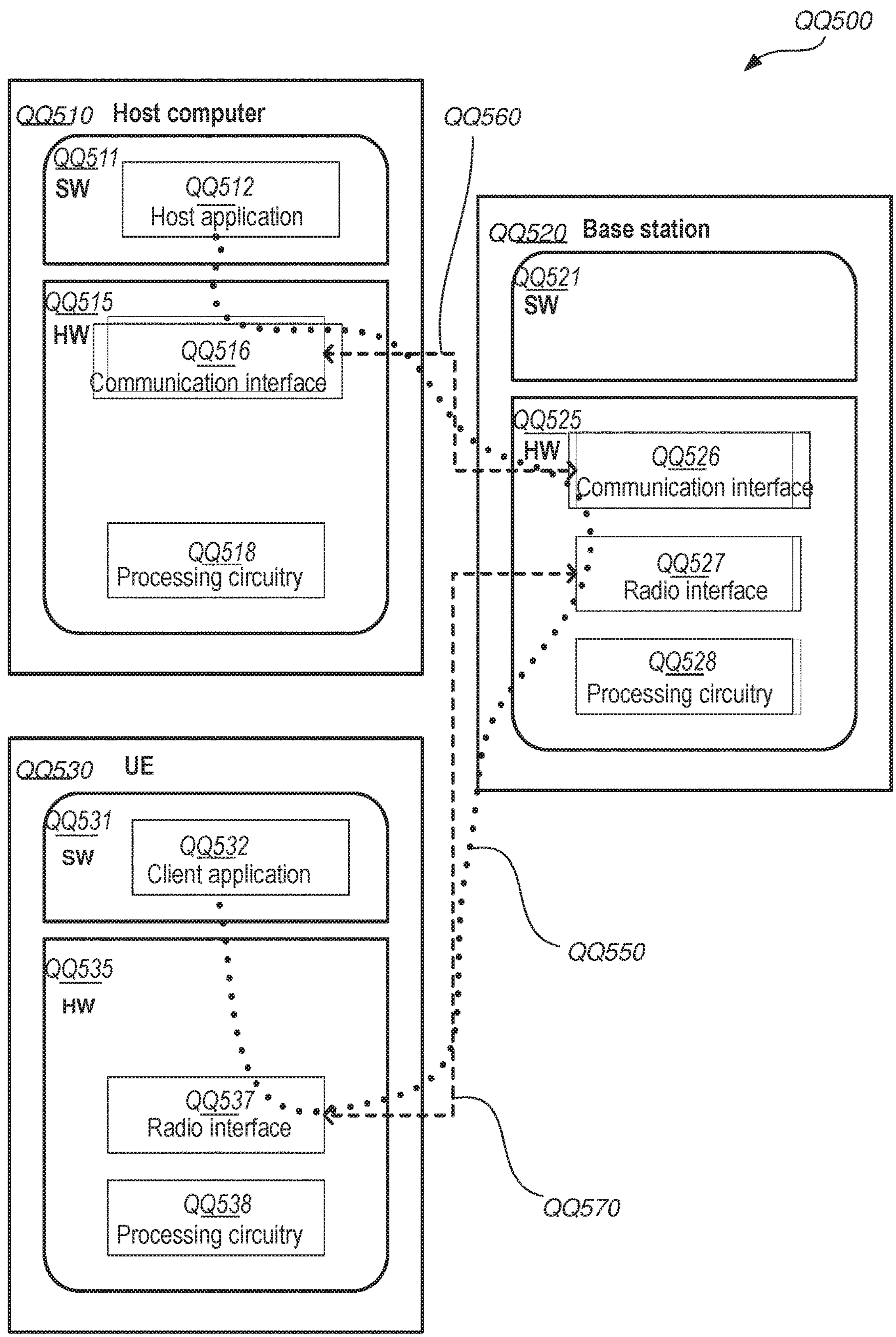
FIG. 11 shows a host computer communicating via a base station with a user equipment over a partially wireless connection in accordance with some embodiments.

FIG. 11 shows host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 11. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 11) served by base station QQ520. Communication interface QQ526 may be configured to facilitate connection QQ560 to host computer QQ510. Connection QQ560 may be direct or it may pass through a core network (not shown in FIG. 11) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 11 may be similar or identical to host computer QQ430, one of base stations QQ412*a*, QQ412*b*, QQ412*c* and one of UEs QQ491, QQ492 of FIG. 10, respectively. This is to say, the inner workings of these entities may be as shown in FIG. 11 and independently, the surrounding network topology may be that of FIG. 10.

In FIG. 11, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the latency since the UE is able to determine whether the preamble was detected or not and thereby provide benefits such as reduced waiting time and better responsiveness.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 12:
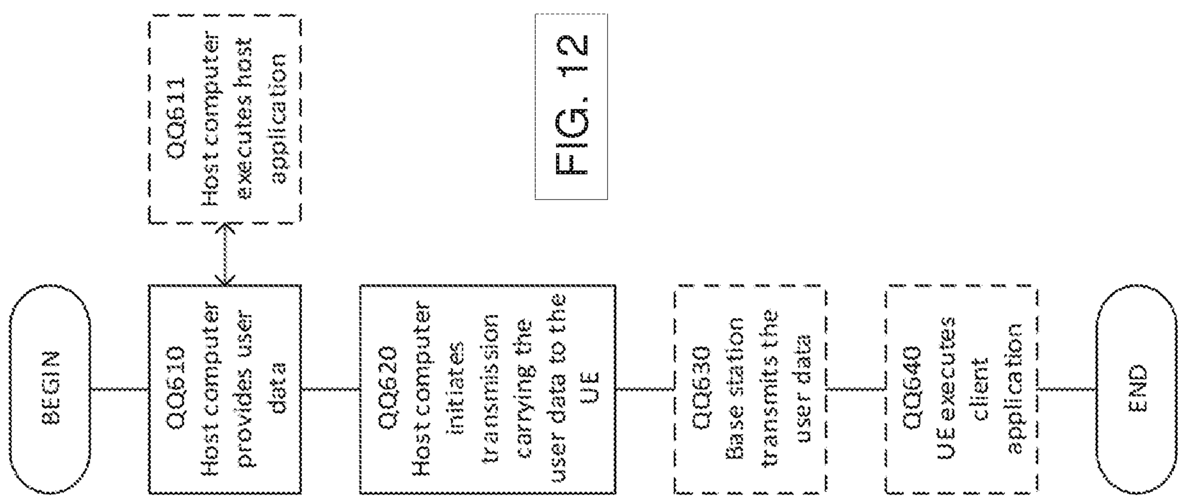
FIG. 12 shows methods implemented in a communication system including a host computer, a base station and a user equipment in accordance with some embodiments.

FIG. 12 shows methods implemented in a communication system including a host computer, a base station and a user equipment in accordance with some embodiments.

FIG. QQ6 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 13:
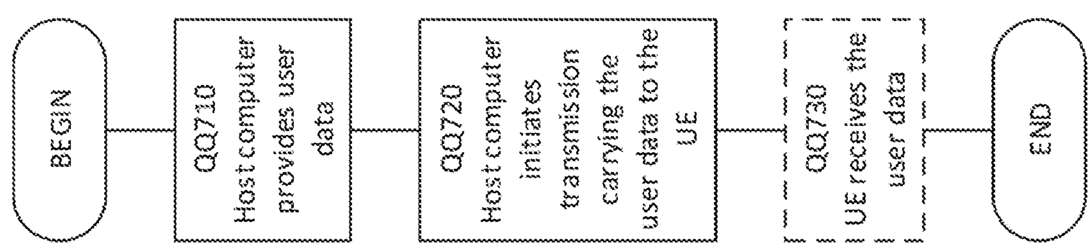
FIG. 13 shows methods implemented in a communication system including a host computer, a base station and a user equipment in accordance with some embodiments.

FIG. 13 shows methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

FIG. 14 shows methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 15 shows methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a radio network node for handling communication of a wireless device in a wireless communication network, the method comprising:

receiving, from the wireless device, a preamble of a random access procedure on one of a first carrier and a second carrier;

transmitting, to the wireless device, a random access response (RAR), the RAR indicating a third carrier out of the one of the first carrier and the second carrier the preamble was received on; and the RAR indicating the third carrier by comprising one or more indicators in a medium access control, MAC, and sub-header, the one or more indicators being a bitmap appended either at an end of the MAC sub-header or located at a beginning of the MAC sub-header, the RAR indicating that the third carrier out of the first carrier and the second carrier the preamble was received on by comprising at least one of one out of two temporary Cell Radio Network Temporary Identifiers and one time alignment command out of two time alignment commands each being associated with a respective carrier.

2. The method according to claim 1, wherein the transmission of the RAR indicates the third carrier by the RAR being transmitted in one of a first time position reserved for the first carrier and in a second time position reserved for the second carrier.

3. The method according to claim 1, wherein the first carrier is a carrier for new radio transmissions and the second carrier is for a Supplemental Uplink transmission.

4. The method according to claim 1, further comprising;

transmitting, a configuration of the RAR and how the one of the RAR and the transmission of the RAR indicates the third carrier the preamble was received on at the radio network node.

5. A method performed by a wireless device for handling communication of the wireless device in a wireless communication network, the method comprising:

transmitting, to a radio network node, a preamble of a random access procedure on one of a first carrier and a second carrier and receiving, from the radio network node, a random access response (RAR), indicating a third carrier out of the one of the first carrier and the second carrier the preamble was received on at the radio network node;

determining whether the preamble has been detected or not taking the received RAR into account; and the RAR indicates the third carrier by comprising one or more indicators in a medium access control, MAC, and sub-header, the one or more indicators being a bitmap appended at an end of the MAC sub-header or located at a beginning of the MAC sub-header, the RAR indicating that the third carrier out of the first carrier and the second carrier the preamble was received on by comprising at least one of one out of two temporary Cell Radio Network Temporary Identifiers and one time alignment command out of two time alignment commands each being associated with a respective carrier.

6. The method according to claim 5, wherein the reception of the RAR indicates the third carrier by the RAR being one of received in a first time position reserved for the first carrier and the RAR being received in a second time position reserved for the second carrier.

7. The method according to claim 5, wherein the first carrier is a carrier for new radio transmissions and the second carrier is for a Supplemental Uplink transmission.

8. The method according to claim 5, further comprising;

receiving, a configuration of the RAR and how the RAR or the reception of the RAR indicates the third carrier the preamble was received on at the radio network node.

9. A radio network node configured to handle communication of a wireless device in a wireless communication network, the radio network node comprising:

processing circuitry and memory having program instructions stored therein, the program instructions being executable by the processing circuitry so that the radio network node is configured to:

receive, from the wireless device, a preamble of a random access procedure on one of a first carrier and a second carrier;

transmit, a random access response (RAR), the RAR indicating a third carrier out of the one of the first carrier and the second carrier the preamble was received on; and the RAR indicating the third carrier by comprising one or more indicators in a medium access control, MAC, and sub-header, the one or more indicators being a bitmap appended at an end of the MAC sub-header or located at a beginning of the MAC sub-header, the RAR indicating that the third carrier out of the first carrier and the second carrier the preamble was received on by comprising at least one of one out of two temporary Cell Radio Network Temporary Identifiers and one time alignment command out of two time alignment commands each being associated with a respective carrier.

10. The radio network node according to claim 9, wherein the transmission of the RAR indicates the third carrier by the RAR being transmitted in one of a first time position reserved for the first carrier and in a second time position reserved for the second carrier.

11. The radio network node according to claim 9, wherein the first carrier is a carrier for new radio transmissions and the second carrier is for a Supplemental Uplink transmission.

12. The radio network node according to claim 9, wherein the program instructions are further executable by the processing circuitry so that the wireless device is configured to transmit a configuration of the RAR and how the one of the RAR and the transmission of the RAR indicates the carrier the preamble was received on at the radio network node.

13. A wireless device configured to handle communication of the wireless device in a wireless communication network, wherein the wireless device comprises:

processing circuitry and memory having program instructions stored therein, the program instructions being executable by the processing circuitry so that the wireless device is configured to:

transmit to a radio network node, a preamble of a random access procedure on one of a first carrier and a second carrier;

receive from the radio network node, a random access response (RAR), the RAR indicating a third carrier out of the one of the first carrier and the second carrier the preamble was received on at the radio network node;

determine whether the preamble has been detected or not taking the received RAR into account; and the RAR indicating the third carrier by comprising one or more indicators in a medium access control, MAC, and sub-header, the one or more indicators being a bitmap appended at an end of the MAC sub-header or located at a beginning of the MAC sub-header, the RAR indicating that the third carrier out of the first carrier and the second carrier the preamble was received on by comprising at least one of one out of two temporary Cell Radio Network Temporary Identifiers and one time alignment command out of two time alignment commands each being associated with a respective carrier.

14. The wireless device according to claim 13, wherein the reception of the RAR indicates the third carrier by the RAR being one of received in a first time position reserved for the first carrier and the RAR being received in a second time position reserved for the second carrier.

* * * * *